Figure 1:
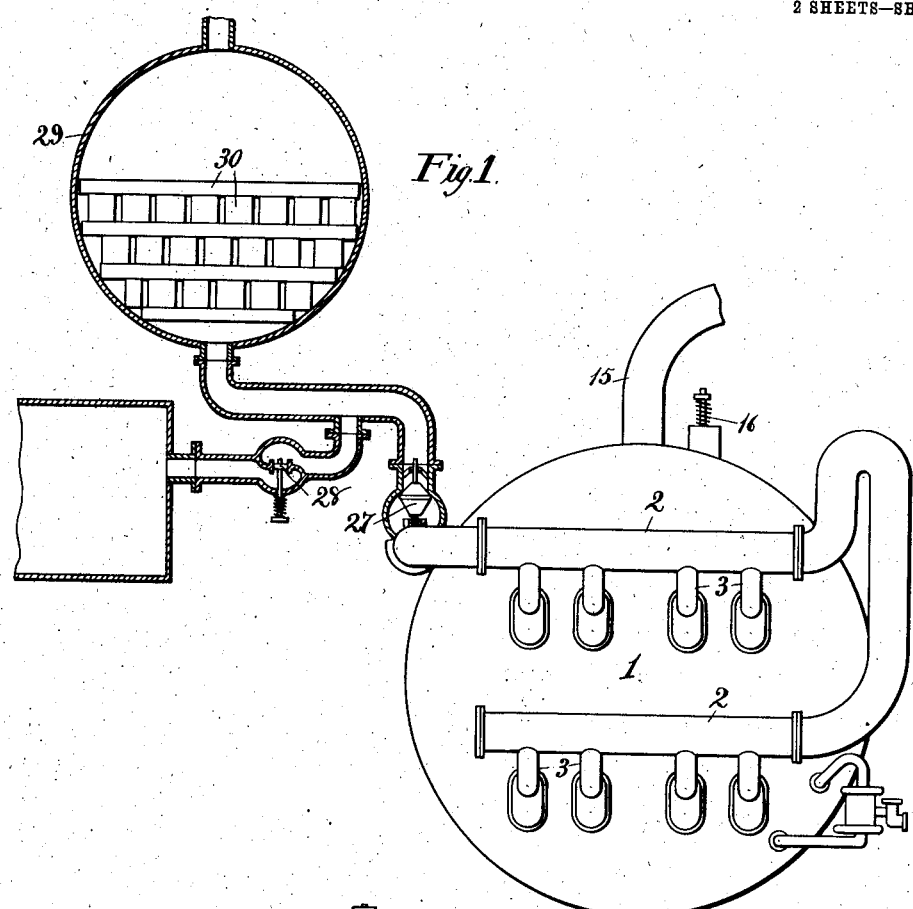

No. 839,320. PATENTED DEC. 25, 1906.
A. C. E. RATEAU.
STEAM REGENERATIVE ACCUMULATOR.
APPLICATION FILED MAR. 3, 1905.

2 SHEETS—SHEET 1.

Witnesses:
Chas. F. Bauer
Leon Stroh

Inventor,
A. C. E. Rateau
By G. L. Cross
Atty.

No. 839,320. PATENTED DEC. 25, 1906.
A. C. E. RATEAU.
STEAM REGENERATIVE ACCUMULATOR.
APPLICATION FILED MAR. 3, 1905.
2 SHEETS—SHEET 2.
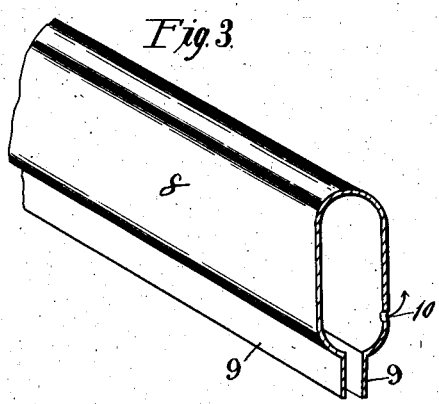
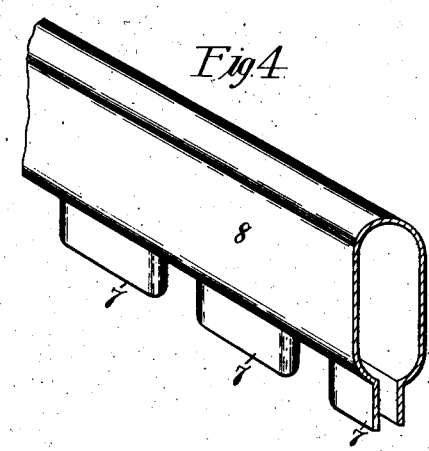
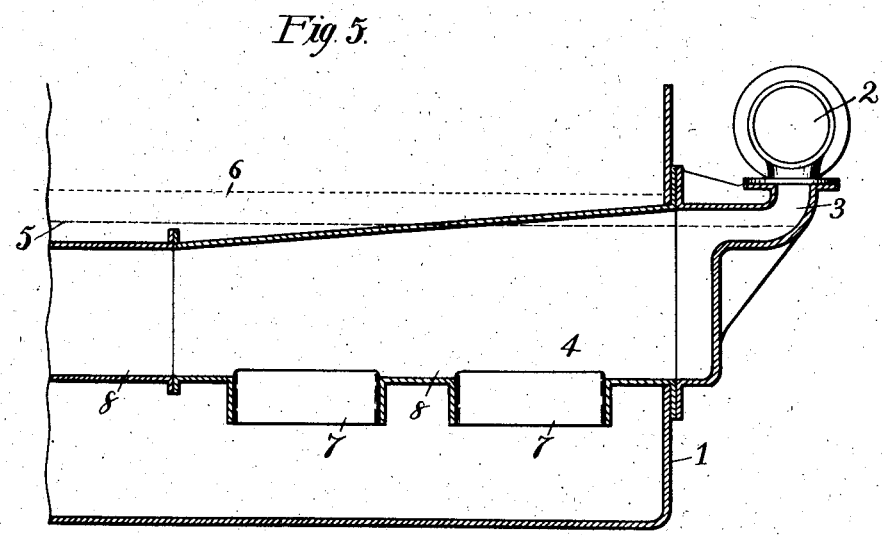

UNITED STATES PATENT OFFICE.

AUGUSTE CAMILLE EDMOND RATEAU, OF PARIS, FRANCE.

STEAM-REGENERATIVE ACCUMULATOR.

No. 839,320.　　　　Specification of Letters Patent.　　　　Patented Dec. 25, 1906.

Application filed March 3, 1905. Serial No. 248,189.

*To all whom it may concern:*

Be it known that I, AUGUSTE CAMILLE EDMOND RATEAU, a citizen of the United States, residing at Paris, France, have invented a certain new and useful Improvement in Steam-Regenerative Accumulators, of which the following is a full, clear, concise, and exact description, reference being had to the accompanying drawings, forming a part of this specification.

My invention relates to steam-regenerative accumulators of such a type, for example, as that illustrated in my reissued Letters Patent, No. 12,295, dated December 27, 1904, though the invention need not be restricted precisely to the apparatus disclosed in said patent.

My invention has several objects, one being the provision of means whereby distinct bodies of water or other suitable liquid may be maintained in a given vessel substantially at suitable levels, to which end the horizontally-disposed diaphragm is placed in the vessel when two bodies of liquid are desired therein and as many additional diaphragms as there are additional bodies of water or liquid desired, an overflow-duct extending through each diaphragm, so that the water or liquid supported by said diaphragm may not exceed a given level, but will pass to the body of liquid below the diaphragm. If this body of liquid should be the lowermost body, a duct or opening is provided whereby the level of said latter body is approximately maintained. This latter feature of the apparatus preferably resides in a float-chamber having communication with the portion of the vessel in which the lowermost body of liquid is maintained both above and below the desired level of said liquid, a valve, operated by the float in said chamber, rising when the level of the liquid exceeds a predetermined plane to permit the liquid to be discharged, whereby the said liquid is approximately maintained at the selected level. The pipe that affords communication between the bodies of liquid is preferably adjustable in length, so that the level of the liquid immediately in association with said pipe may be regulated. A separate pipe is preferably employed that affords communication between the spaces above the bodies of liquid, so that the steam as it is regenerated may collect in the uppermost space and be thence discharged to perform the work to which it is adapted. Piping is employed that conveys steam that is to be regenerated into these bodies of liquid. When the piping that is to convey the steam into the bodies of liquid is inserted a considerable distance within said bodies, I preferably so modify its construction that the water coming within the pipes when the apparatus is idle, or partially so, may quickly find exit, so that the steam may readily find entrance to the portion of the piping within the liquid to be thence discharged into the liquid, so that it may be regenerated. This modification of the piping may be used in the apparatus of my reissued patent or the invention of my present application and may reside in the formation of a slot in its bottom portion, for which purpose parallel flanges may be employed, preferably extending below the piping, so as to promote the circulation of the liquid, which is desirable in the operation of the accumulator, or if it is not desired to form a continuous slot in the bottom of the piping displaced openings of large size may be substituted, short pipes of the size of the openings communicating therewith also for the purpose of promoting the circulation of the liquid.

Another feature of my invention that may be practiced without regard to the number of bodies of liquid within the vessel resides in the provision of a plurality of pipes located substantially abreast—that is, extending into the body of liquid independently of each other—and the provision of a pipe upon the exterior of the accumulator vessel provided with a series of taps or branches, one for each of said pipes within the vessel, the exterior pipe being above the level of the liquid body, so that when the apparatus is idle, or partially so, the liquid will not rise within the said exterior pipe.

Another feature of my invention resides in the enlargement of the piping within the vessel where it communicates with the piping upon the exterior of the vessel, so that as the steam to be regenerated is admitted to the said piping the water may quickly be pushed out of the balance of the piping within the vessel that is of smaller cross-section.

Another feature of my invention resides in the provision of means whereby the liquid within the vessel may not be forced back through the piping that conveys the steam to be regenerated to the vessel of the accumulator, for in apparatus as hitherto constructed there is danger of the pressure within the accumulator forcing the liquid (water) back through the pipe that conveys this steam to be regenerated, which may occasion great damage, particularly where the steam to be regenerated is supplied from the exhaust of an engine, as is usually the case. Obviously the backflow of water through this pipe would cause great inconvenience, if not very harmful results, as will be apparent to those skilled in the art. Such results are likely to happen when the engine stops, for then the pressure within the accumulator vessel is not sufficiently counteracted by any pressure remaining in the pipe. In my present embodiment of this feature of the apparatus I provide a valve located in the piping at such a point that the liquid in the vessel will be prevented from lowering materially below the level at which the liquid is to be maintained, for the said valve will operate when the liquid has reached the same in its backflow.

Another feature of my invention resides in the provision of means whereby when the accumulator and the engine associated therewith are in operation the pressure within the piping may be maintained substantially at a predetermined level, so that the required cushion in the cylinder of the engine from which the exhaust-steam is supplied may be had.

Another feature of my invention resides in the interposition of an enlargement in the piping that is to convey the steam to be regenerated, in which enlargement the steam to be regenerated is first received before it is passed to the accumulator, so as to eliminate sudden impacts of steam from the source of steam-supply, from which the steam that is to be regenerated is passed through the piping to the accumulator. There may be provided heat-retaining bodies in this enlargement or steam-reservoir to break the impact of the impulses of steam, thereby to obtain a partial initial regulation of the flow of steam and a partial exchange of temperatures between the steam and said heat-retaining bodies.

I will explain my invention more fully by reference to the accompanying drawings, illustrating the preferred embodiment thereof, in which—

Figure 2:
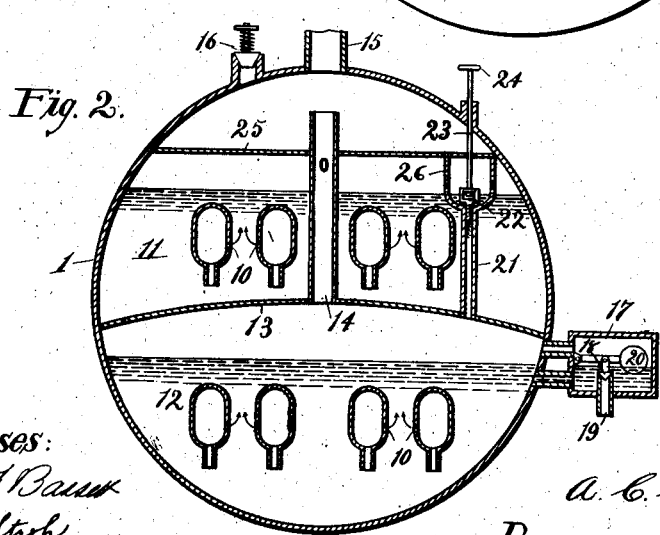

Figure 1 is a front elevation, partially in section, of an apparatus constructed in accordance with the invention. Fig. 2 is a view in section of the apparatus illustrated in Fig. 1. Fig. 3 is a view in perspective of one form of piping. Fig. 4 is a view in perspective of another form of piping. Fig. 5 is a view in longitudinal section, illustrating the enlargement of the pipe within the vessel at the place where the pipe upon the exterior of the vessel communicates therewith.

Like parts are indicated by similar characters of reference throughout the different figures.

The main vessel 1 has a pipe 2 upon its exterior, located above the level of the corresponding body of liquid within the vessel, each branch of the pipe being located above each body of liquid when there is a plurality of bodies of liquid within the vessel. The piping 2 has downwardly-extending branches 3, that communicate with the end portions 4 of the piping within the vessel, as indicated most clearly in Fig. 5, these end portions being larger than the balance of the piping within the vessel for the purpose hitherto described. The level of the water may be, as indicated, at the dotted line 5 when the accumulator is not working and as indicated at the dotted line 6 when the accumulator is working, the enlargement 4 enabling the newly-incoming steam more readily to effect evacuation or partial evacuation of the liquid previously in the pipe. This evacuation may be further promoted by providing the pipes 7 at the bottom of the piping within the vessel, which said piping is designated by the numeral 8. The piping 7 may be omitted, if desired, but is preferred, as the water issuing through the openings in the bottom of the piping 8 is caused more actively to circulate within the vessel. If preferred, the bottom of the piping 8 may be longitudinally slotted, and this slot may be continued, if desired, between parallel flanges 9 for the same purpose of effecting circulation of the water within the vessel. Steam may issue through the piping 8 through the openings 10 in said piping, located above the slotted bottoms of the pipes, the steam eventually finding access above the levels of the bodies of liquid 11 12, the body of liquid 11 being preferably in the same vessel with the body of liquid 12, for which purpose the vessel has a diaphragm 13 extending across the same. A pipe 14 affords communication between the space above the bodies of liquid 12, whereby the regenerated steam may be ultimately received in the topmost space within the vessel, to be thence discharged through the outlet 15 at a unified pressure to perform the work to which it is adapted. A safety-valve 16 may be disposed at any suitable point, so that the pressure of the steam will not exceed a predetermined maximum, it being indicated for the sake of clearness in a diagrammatic illustration at the top of the vessel 1.

In order that the bottom body of liquid 12 may be maintained substantially at a suitable level, a float-chamber 17 is provided, which chamber has communication with the vessel 1 both above and below the said level, the float-chamber containing a valve 18, that may open and close an outlet 19, which valve 18 is operated by a float 20, connected therewith. In order that the level of the liquid in any body above the body 12 may be maintained, I employ a pipe 21, that communicates with the space below the diaphragm 13 and with the space above the body 11, (or other upper body of liquid,) said pipe 21 desirably having an extensible section 22, whereby the upper mouth of said pipe 21 may be elevated or lowered to determine the point at which the liquid 11 will flow into said pipe, whereby the level that is desired for the body 11 may be regulated. For the purpose of this adjustment I preferably provide a shaft 23, that extends through a stuffing-box in the wall of the vessel 1, which shaft terminates in a wheel 24, so that the shaft may be turned to turn the section 22 in mechanical engagement therewith, which section 22 has threaded engagement with the balance of the pipe 21, whereby said section may be elevated and lowered for the purpose stated. Any suitable structure within the vessel may be employed for reinforcing the support for the elements 14, 21, and 22, there being indicated a plate 25 for this purpose, to which plate the pipe 14 is attached near its upper end and to which plate a perforated bell-shaped extension 26 of the fixed portion of the pipe 21 is fastened. It is to be understood that the plate 25 is merely a brace and does not extend the length of the chamber 1, so that steam from the compartment 11 may find access to the top of the chamber 1 and through the duct 15. A valve 27 may be included in the piping 2, that is operated upon the backflow of the liquid within the vessel, so that said liquid will not reach the engine or other source of steam-supply from which steam that is to be regenerated is received.

In order that a given pressure may be maintained in the piping while the entire apparatus is in operation, a valve 28 is employed that is preferably subject both to pressure within the piping and to pressure of the steam from a source supplemental with respect to that source from which the steam that is to be regenerated is received. This source of supplemental pressure may be the vessel 1, or it may be a source distinct from the vessel—for example, the boiler from which the engine is operated. In order that the steam may not be received from the piping 2 within the vessel 1 with impulses that are too violent, I provide in the said piping an enlargement or header 29, that acts, so to speak, as a steam-reservoir, in which reservoir heat-retaining bodies 30, such as a pile of iron rails, may be disposed for the purpose hitherto set forth. The function of the valve 28 may be useful whether liquid or other heat-retaining means is employed within the vessel.

I claim—

1. In a steam-regenerative accumulator in combination, a vessel containing liquid as a heat-carrier, piping for directing steam into the liquid, a duct or opening for substantially maintaining the liquid at a given level, a steam-escape valve, said vessel having an outlet above said level for conveying steam from said vessel, said piping projecting within the liquid and having openings through which steam escapes into the liquid and being slotted at its bottom portion for the discharge of liquid therethrough.

2. In a steam-regenerative accumulator in combination, a vessel containing liquid as a heat-carrier, piping for directing steam into the liquid, a duct or opening for substantially maintaining the liquid at a given level, a steam-escape valve, said vessel having an outlet above said level for conveying steam from said vessel, said piping projecting within the liquid and having openings through which steam escapes into the liquid and being slotted at its bottom portion for the discharge of liquid therethrough, said openings in the piping being provided with a continuation or passage for the purpose of promoting circulation in the liquid.

3. In a steam-regenerative accumulator in combination, a vessel containing liquid as a heat-carrier, said liquid being subdivided into two bodies, one elevated with respect to the other, piping for directing steam to the liquid, a pipe, variable in length, effecting a passage between the spaces occupied by the two bodies of liquid providing a limiting-level for the upper body of liquid, a duct or opening for substantially maintaining the liquid of the lower body at a given level, and a steam-escape valve, said vessel having an outlet above a liquid-level for conveying the regenerated steam to its point of application.

4. In a steam-regenerative accumulator in combination, a vessel containing liquid as a heat-carrier, said liquid being subdivided into a plurality of bodies, one elevated with respect to another, piping for directing steam to the liquid, a pipe, variable in length, effecting a passage between the spaces occupied by the bodies of liquid providing a limiting-level for an upper body of liquid, a duct or opening for substantially maintaining the liquid of the lower body at a given level, a steam-escape valve, said vessel having an outlet above a liquid-level for conveying the regenerated steam to its point of application, and means operable from the exterior of the accumulator for adjusting the length of said pipe.

5. In a steam-regenerative accumulator in combination, a vessel containing liquid as a heat-carrier, said liquid being subdivided into a plurality of bodies, one elevated with respect to another, piping for directing steam to the liquid, a pipe, variable in length, effecting a passage between the spaces occupied by the bodies of liquid providing a limiting-level for an upper body of liquid, a duct or opening for substantially maintaining the liquid of the lower body at a given level, a steam-escape valve, said vessel having an outlet above a liquid-level for conveying the regenerated steam to its point of application, and piping affording communication between the spaces above the said bodies of liquid for the accumulation of regenerated steam.

6. In a steam-regenerative accumulator in combination, a vessel containing liquid as a heat-carrier, said liquid being subdivided into a plurality of bodies, one elevated with respect to another, piping for directing steam to the liquid, a pipe, variable in length, effecting a passage between the spaces occupied by the bodies of liquid providing a limiting-level for an upper body of liquid, a duct or opening for substantially maintaining the liquid of the lower body at a given level, a steam-escape valve, said vessel having an outlet above a liquid-level for conveying the regenerated steam to its point of application, means operable from the exterior of the accumulator for adjusting the length of said pipe, and piping affording communication between the spaces above the said bodies of liquid for the accumulation of regenerated steam.

7. In a steam-regenerative accumulator in combination, a vessel containing liquid as a heat-carrier, piping for directing steam into the liquid, said piping projecting within the liquid and having openings through which steam escapes into the liquid and being slotted at its bottom portion for the discharge of liquid therethrough.

8. In a steam-regenerative accumulator in combination, a vessel containing liquid as a heat-carrier, piping for directing steam into the liquid, said piping projecting within the liquid and having openings through which steam escapes into the liquid and being slotted at its bottom portion for the discharge of liquid therethrough, the slot at the bottom of the piping being provided with a continuation or passage.

9. In a steam-regenerative accumulator in combination, a vessel containing liquid as a heat-carrier, said liquid being subdivided into a plurality of bodies, one elevated with respect to another, piping for directing steam to the liquid, a pipe, variable in length, effecting a passage between the spaces occupied by the bodies of liquid providing a limiting-level for an upper body of liquid.

10. In a steam-regenerative accumulator in combination, a vessel containing liquid as a heat-carrier, said liquid being subdivided into a plurality of bodies, one elevated with respect to another, piping for directing steam to the liquid, a pipe, variable in length, effecting a passage between the spaces occupied by the bodies of liquid providing a limiting-level for an upper body of liquid, a duct or opening for substantially maintaining the liquid of the lower body at a given level, and means operable from the exterior of the accumulator for adjusting the length of said pipe.

11. In a steam-regenerative accumulator in combination, a vessel containing liquid as a heat-carrier, said liquid being subdivided into a plurality of bodies, one elevated with respect to another, piping for directing steam to the liquid, a pipe, variable in length, effecting a passage between the spaces occupied by the bodies of liquid providing a limiting-level for an upper body of liquid, and piping affording communication between the spaces above the said bodies of liquid for the accumulation of regenerated steam.

12. In a steam-regenerative accumulator in combination, a vessel containing liquid as a heat-carrier, said liquid being subdivided into a plurality of bodies, one elevated with respect to another, piping for directing steam to the liquid, a pipe, variable in length, effecting a passage between the spaces occupied by the bodies of liquid providing a limiting-level for an upper body of liquid, means operable from the exterior of the accumulator for adjusting the length of said pipe, and piping affording communication between the spaces above the said bodies of liquid for the accumulation of regenerated steam.

13. In a steam-regenerative accumulator in combination, a vessel containing liquid as a heat-carrier, piping for directing steam into the liquid, said piping projecting within the liquid and being slotted at its bottom portion for the discharge of liquid therethrough, the slot at the bottom of the piping being provided with a continuation or passage.

14. A steam-regenerative accumulator including a vessel containing liquid, piping horizontally disposed in the liquid and longitudinally slotted at its bottom for permitting the discharge of steam into the liquid, and downwardly-depending flanges margining the discharge portions of the piping.

15. A steam-regenerative accumulator including a vessel containing liquid, piping horizontally disposed in the liquid and apertured at its bottom for permitting the discharge of steam into the liquid, and downwardly-depending flanges margining the discharge portions of the piping.

16. A steam-regenerative accumulator including a vessel containing liquid, piping extending into the liquid for discharging steam therein and having a portion projecting above the liquid-level, and piping for leading steam to the piping within the vessel, having communication directly with the portion of the piping above the liquid-level and also with the portion of the piping within the liquid.

17. A steam-regenerative accumulator including a vessel containing liquid, piping extending into the liquid for discharging steam therein and having a portion projecting above the liquid-level, and piping for leading steam to the piping within the vessel, having communication directly with the portion of the piping above the liquid-level.

18. A steam-regenerative accumulator including a vessel containing liquid, piping extending into the liquid, serving to discharge steam into the liquid along the length of the piping, the portion of the piping within the liquid being substantially horizontally disposed and having the discharge portions thereof located in the bottom of the piping.

19. A steam-regenerative accumulator including a vessel containing liquid, piping extending into the liquid and having a portion projecting above the liquid-level, said piping serving to discharge steam into the liquid along the length of the piping.

20. The combination with steam-regenerative accumulator apparatus including a plurality of heat-storage devices, each capable of regenerating steam, and a conduit common to the steam-spaces for said devices for collecting the steam from said devices and unifying the pressure thereof, said heat-storage devices including liquid as heat-retainers, said conduit having communication directly with the steam-spaces above the liquid bodies, whereby the steam after being regenerated is collected without passing through said liquid.

21. In combination, a steam-reservoir, a steam-regenerative accumulator apparatus including a plurality of heat-storage devices connected thereto and receiving steam therefrom, and a common duct or passage receiving steam from said heat-storage devices to convey steam therefrom.

22. A steam-regenerative accumulator apparatus including a plurality of heat-retaining bodies of liquid, one disposed above another, and means affording communication between said bodies and serving adjustably to determine their relative levels.

23. A steam-regenerative accumulator apparatus including a plurality of heat-retaining bodies of liquid, and means affording communication between said bodies and serving adjustably to determine their relative levels.

24. A steam-regenerative accumulator apparatus including a plurality of heat-retaining bodies of liquid, and means serving adjustably to determine the relative levels of said liquid bodies.

25. In combination, a steam-reservoir for receiving steam, a steam-regenerative accumulator into which steam is discharged from the steam-reservoir, a source of supplemental steam, and means controlled by the aforesaid steam for governing the supply of supplemental steam to the aforesaid steam.

26. The combination with a steam-regenerative accumulator containing a heat-retaining body for regenerating steam, a source of supplemental steam, and valve mechanism governed by the steam-pressure for controlling the supply of supplemental steam to said accumulator.

27. In combination, a steam-regenerative accumulator, a source of supplemental steam, and automatic means for governing the admission of additional steam from said source to the accumulator.

28. In combination, a steam-reservoir for receiving steam, a steam-regenerative accumulator into which steam is discharged from the steam-reservoir, a source of supplemental steam, and automatic means for furnishing a supplemental supply of steam to the accumulator.

29. An engine, steam-regenerative accumulator apparatus including a plurality of heat-storage devices receiving exhaust-steam from the engine, each capable of regenerating steam, and a conduit common to the steam-spaces for said devices for collecting the steam from said devices and unifying the pressure thereof.

30. In combination, a steam-regenerative accumulator apparatus having a plurality of distinct liquid heat-retaining bodies, and pipe-sections located abreast for projecting the steam into said bodies.

31. In combination, a steam-regenerative accumulator apparatus having a plurality of distinct heat-retaining bodies, pipe-sections located abreast for projecting the steam into said apparatus, and a conduit in communication with all of the steam-spaces for the heat-retaining bodies for receiving the steam-discharge.

32. In combination, a steam-regenerative accumulator apparatus having a plurality of distinct heat-retaining bodies, and pipe-sections located abreast for conveying the steam to said bodies.

33. In a steam-regenerator in combination a plurality of liquid heat-retaining bodies, piping directing the steam into said bodies and piping serving to equalize the pressure of the steam regenerated by the heat-retaining bodies and having direct communication with the steam-spaces belonging to said heat-retaining bodies.

34. In a steam-regenerator in combination a plurality of heat-retaining bodies, piping directing the steam to said bodies and piping serving to equalize the pressure of the steam generated by the heat-retaining bodies and having direct communication with the steam-spaces belonging to said heat-retaining bodies.

In witness whereof I hereunto subscribe my name this 8th day of February, A. D. 1905.

AUGUSTE CAMILLE EDMOND RATEAU.

Witnesses:
P. J. A. CHALEIL,
JOHN BAKER,
EDWARD W. SIEREL.